US007162266B2

(12) United States Patent
Frank

(10) Patent No.: US 7,162,266 B2
(45) Date of Patent: Jan. 9, 2007

(54) MULTIPLE BAND HANDSET ARCHITECTURE

(75) Inventor: Michael Louis Frank, Los Gatos, CA (US)

(73) Assignee: Avago Technologies Wireless IP (Singapore) Pte.Ltd., Singapore (SG)

( * ) Notice: Subject to any disclaimer, the term of this patent is extended or adjusted under 35 U.S.C. 154(b) by 39 days.

(21) Appl. No.: 11/016,115

(22) Filed: Dec. 17, 2004

(65) Prior Publication Data

US 2006/0135210 A1 Jun. 22, 2006

(51) Int. Cl.
*H04Q 7/20* (2006.01)

(52) U.S. Cl. .................. 455/552.1; 455/78; 455/553.1

(58) Field of Classification Search .............. 455/25, 455/552.1, 78, 83, 553.1, 101, 132
See application file for complete search history.

(56) References Cited

U.S. PATENT DOCUMENTS

2004/0162107 A1* 8/2004 Klemetti et al. ......... 455/553.1
2005/0227631 A1* 10/2005 Robinett ................... 455/83
2005/0245202 A1* 11/2005 Ranta et al. ............... 455/78
2005/0277387 A1* 12/2005 Kojima et al. ............. 455/78
2006/0079275 A1* 4/2006 Ella et al. ............... 455/553.1

FOREIGN PATENT DOCUMENTS

EP 1164719 A1 12/2001
GB 2355155 A 11/2001

OTHER PUBLICATIONS

Search Report under Section 17 (Date of Search Apr. 27, 2006) (1 page).

* cited by examiner

*Primary Examiner*—Erika A. Gary

(57) ABSTRACT

A handset includes two antennae, wherein one antenna is solely dedicated to multi-band frequency division multiplexed signals. The first antenna connects to an antenna switch. The antenna switch further connects to receivers and transmitters of time division band standards. The second antenna transceives a multi-band frequency division multiplexed signal. A modular filter receives the multi-band frequency division multiplexed signal and separates the frequency bands. To provide diversity, the antenna switch connects to a receiver for each frequency division band standard.

14 Claims, 13 Drawing Sheets

MULTIPLE BAND HANDSET ARCHITECTURE

BACKGROUND

Cellular phone systems operate in numerous frequencies and with numerous standards globally. Typically, each frequency band supports several standards. Service providers operate in multiple bands, use different standards, and require that the handsets that they support be usable through their system. Handset manufacturers make handsets for numerous service providers and want to minimize the number of radio types they offer.

The three major standards in use are: GSM, which is worldwide; CDMA which is mostly in North America, and is evolving into WCDMA; and WCDMA which is being deployed worldwide. There are six principal bands used in Europe, much of Asia, and/or North America. They are not exclusive of one another. These bands are also typical but not exclusively used elsewhere in the world, although the great bulk of the cell band communication occurs in these. Handsets currently in production support only some subset of these bands and standards. However, advanced designs are required to satisfy as many of these bands and standards as possible.

TABLE 1

| Nomenclature GSM/WCDMA | Location | Frequencies |
|---|---|---|
| Cellular Band/WCDMA V | North America | 824 to 849 MHz Transmit<br>869 to 894 MHz Receive |
| E-GSM/WCDMA 900 | Europe and Asia | 880 to 915 MHz Transmit<br>925 to 960 MHz Receive |
| none/WCDMA - IV | North America | 1710 to 1770 MHz Transmit<br>2110 to 2170 MHz Receive |
| DCS/WCDMA - III | Europe and Asia | 1710 to 1785 MHz Transmit<br>1805 to 1880 MHz Receive |
| PCS/WCDMA II | North America | 1850 to 1910 MHz Transmit<br>1930 to 1990 MHz Receive |
| UMTS/WCDMA - I | Europe and Asia | 1920 to 1980 MHz Transmit<br>2110 to 2170 MHz Receive |

The standards have mutually incompatible requirements. One such is the multiple bands and standards. The GSM standard allows transmit and receive to alternate (half duplex). GSM also uses frequency division, with transmit and receive portions separated by frequency. CDMA and WCDMA use only frequency division, transmitting and receiving at the same time (full duplex). WCDMA, CDMA and GSM can also coexist within any particular band. In Europe, GSM and WCDMA are offered in the DCS band, GSM, and perhaps soon WCDMA, are offered in the E-GSM band. In North America, GSM, CDMA and WCDMA are offered in both the 850 and PCS bands. There is a new WCDMA only band rolling out in North America, WCDMA IV.

The differences between the full duplex standards (CDMA and WCDMA) and the half duplex (GSM) are another constraint. These differences are such that the transmit portion of the handsets cannot be shared between half and full duplex. However, the Radio Frequency (RF) part of the receive portion of the full duplex portions could be utilized by the half duplex standards. Typically the full duplex path is more expensive and has performance higher than required for half duplex, but in a handset that supports both standards it may be economical to share.

There are numerous differences between CDMA and WCDMA. The important two are higher data rate and increased sensitivity to distortion on the part of WCDMA. The RF filters, RF power amplifiers and RF low noise amplifiers in a front end (the RF part) designed for WCDMA can also be used for CDMA. The base band portion of the handset would have different requirements.

Another constraint is that unless many more base stations are built than available today, WCDMA handsets require at least two receivers to achieve the required higher data rate. These multiple receivers require multiple antennas.

The more difficult interference specifications of WCDMA require a very non-distorting front end. Specifically, any active component between the antenna and the WCDMA power amplifiers will be a source of distortion. Switches in particular add loss and are a major source of distortion.

Another constraint is that the North America bands are not compatible with the European & Asian bands. The Tx portion of the PCS band (1850 to 1910 MHz) overlaps with the Rx portion of the DCS band (1805 to 1880 MHz). The Rx portion of the PCS band (1930 to 1990 MHz) overlaps with the Tx portion of the WCDMA-I band (1920 to 1980 MHz). The Rx portion of the Cell band (869 to 894 MHz) overlaps with the Tx portion of the E-GSM band (880 to 915 MHz). As a consequence, these interfering bands cannot connect to the same antenna unless switching is utilized.

FIG. 1 illustrates prior art architecture. This architecture supports one WCDMA band along with the GSM, and so no longer solves the problem for the market. FIG. 2 is closer to a solution, but offers limited WCDMA coverage worldwide. Additionally, there is a switch in the WCDMA-V Band. This switch is difficult and expensive to implement.

SUMMARY

A handset includes two antennae, wherein one antenna is solely dedicated to multi-band frequency division multiplexed signals. The first antenna connects to an antenna switch. The antenna switch further connects to receivers and transmitters of time division band standards. The second antenna transceives a multi-band frequency division multiplexed signal. A frequency division filter receives the multi-band frequency division multiplexed signal and separates the frequency bands. To provide diversity, the antenna switch further connects to a receiver for one or more of the frequency division band standard(s).

DETAILED DESCRIPTION

Figure 1:
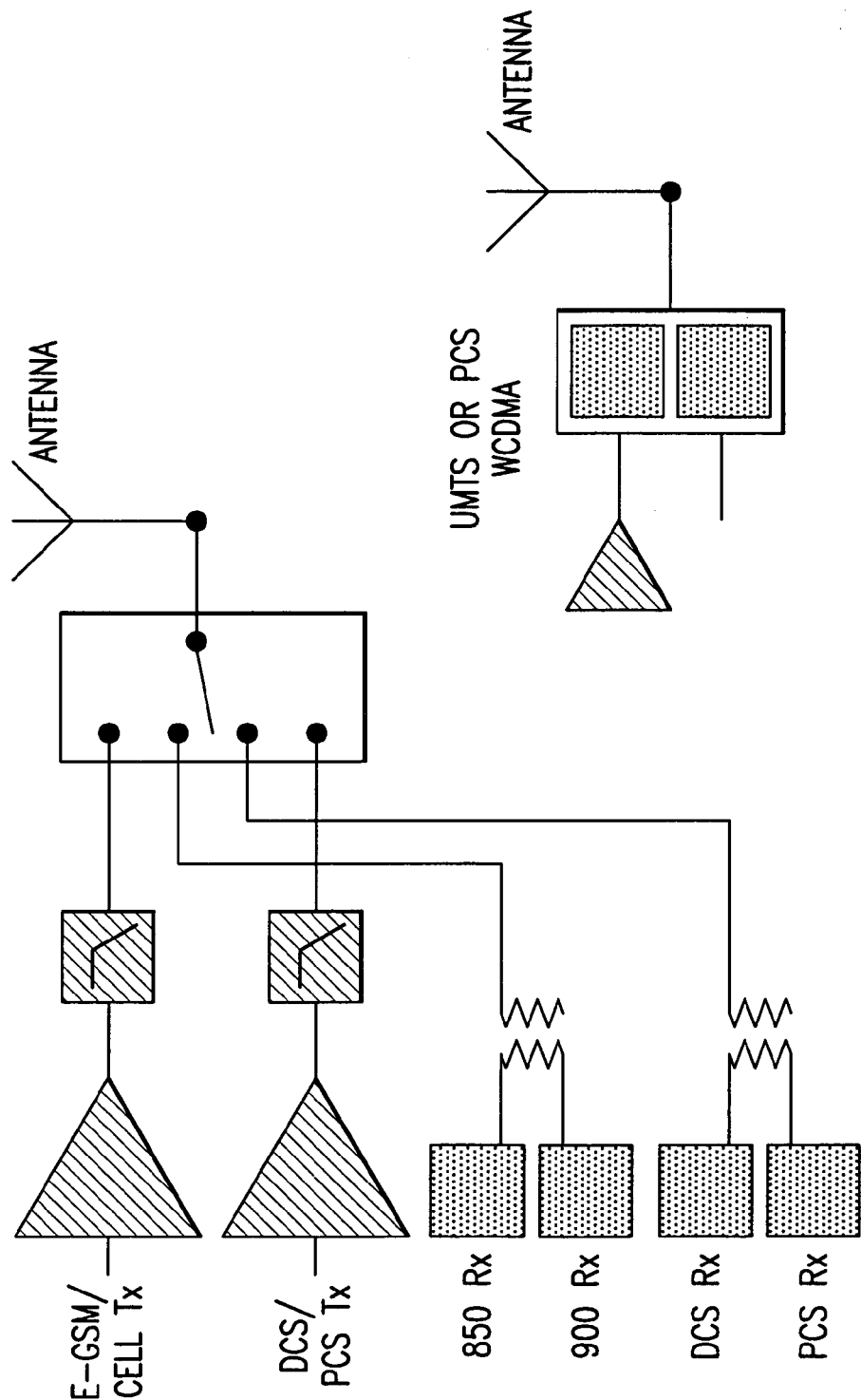
FIG. 1 illustrates a prior art multi-band handset.
Figure 2:
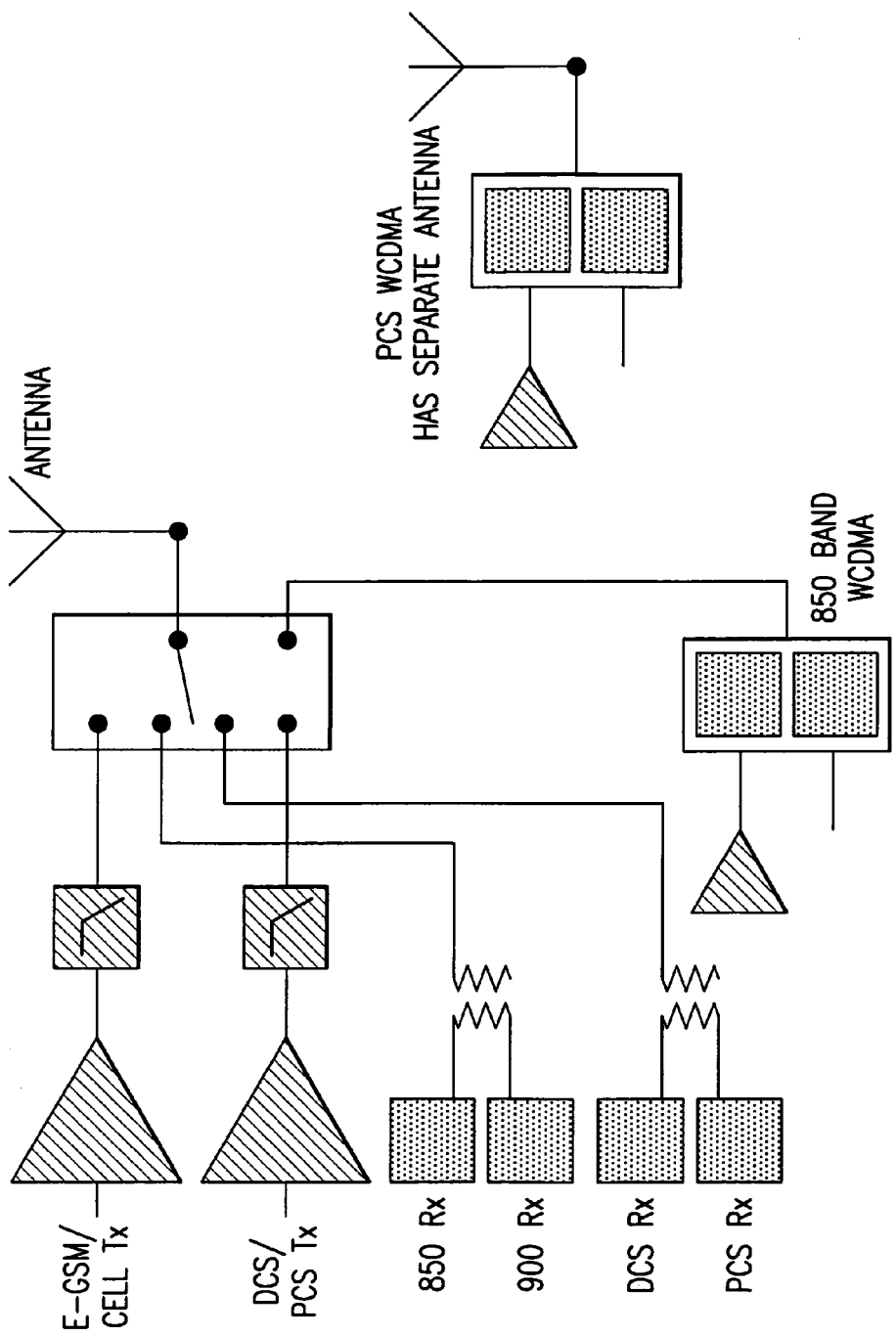
FIG. 2 illustrates a prior art multi-band handset principally for North America.
Figure 3:
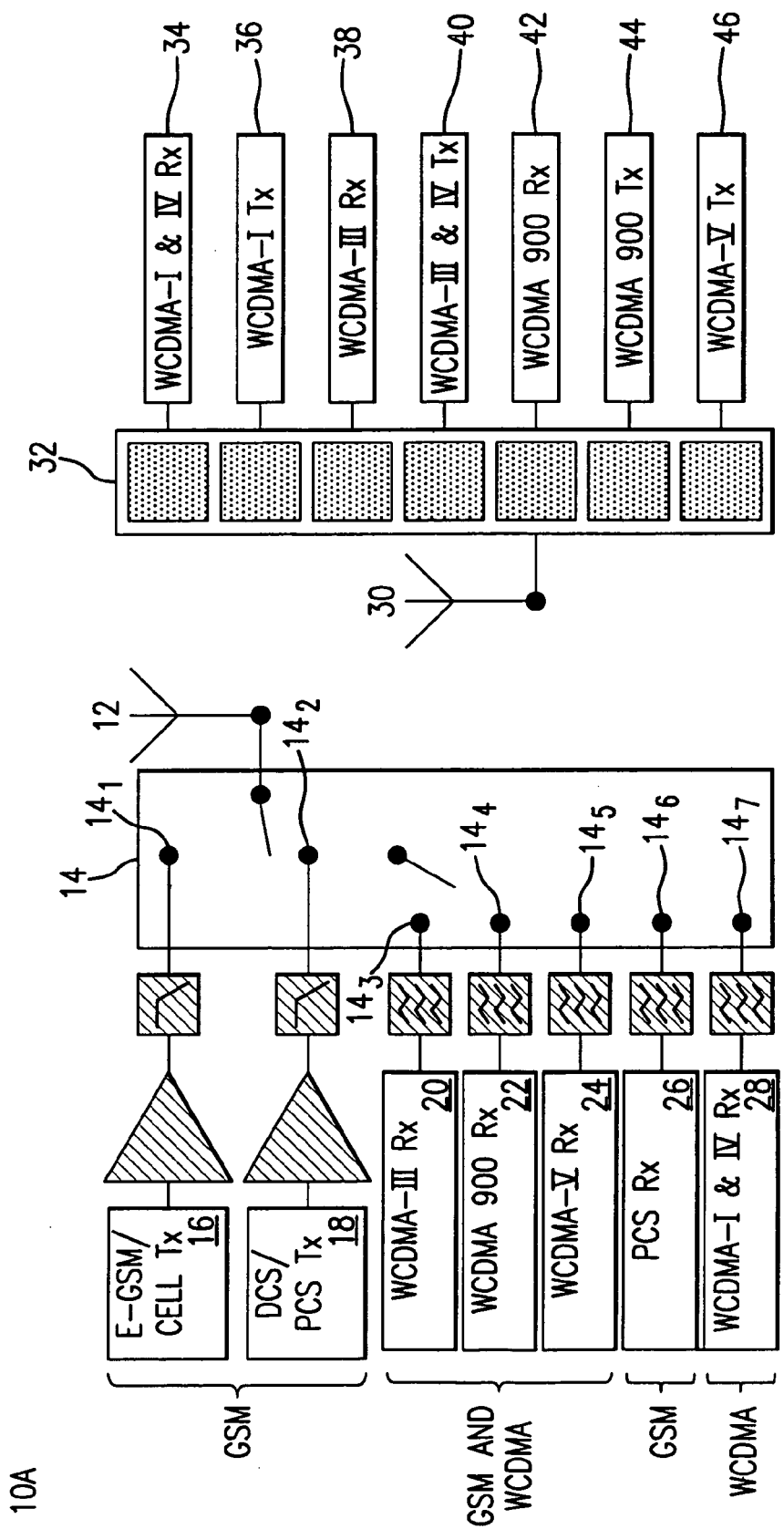
FIG. 3 illustrates a multi-band handset of the present invention.
Figure 4:
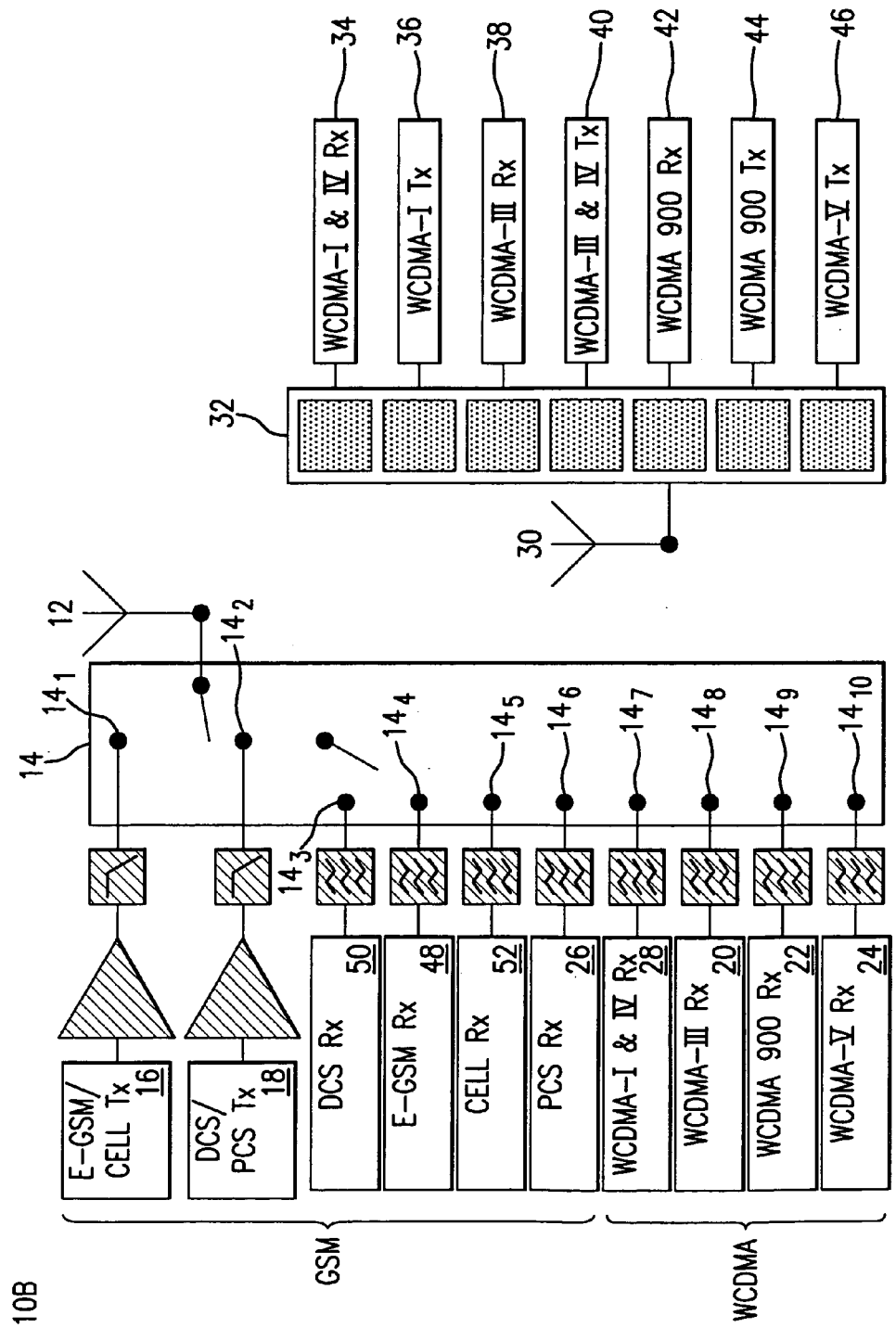
FIG. 4 illustrates a multi-band handset of the present invention.
Figure 9:
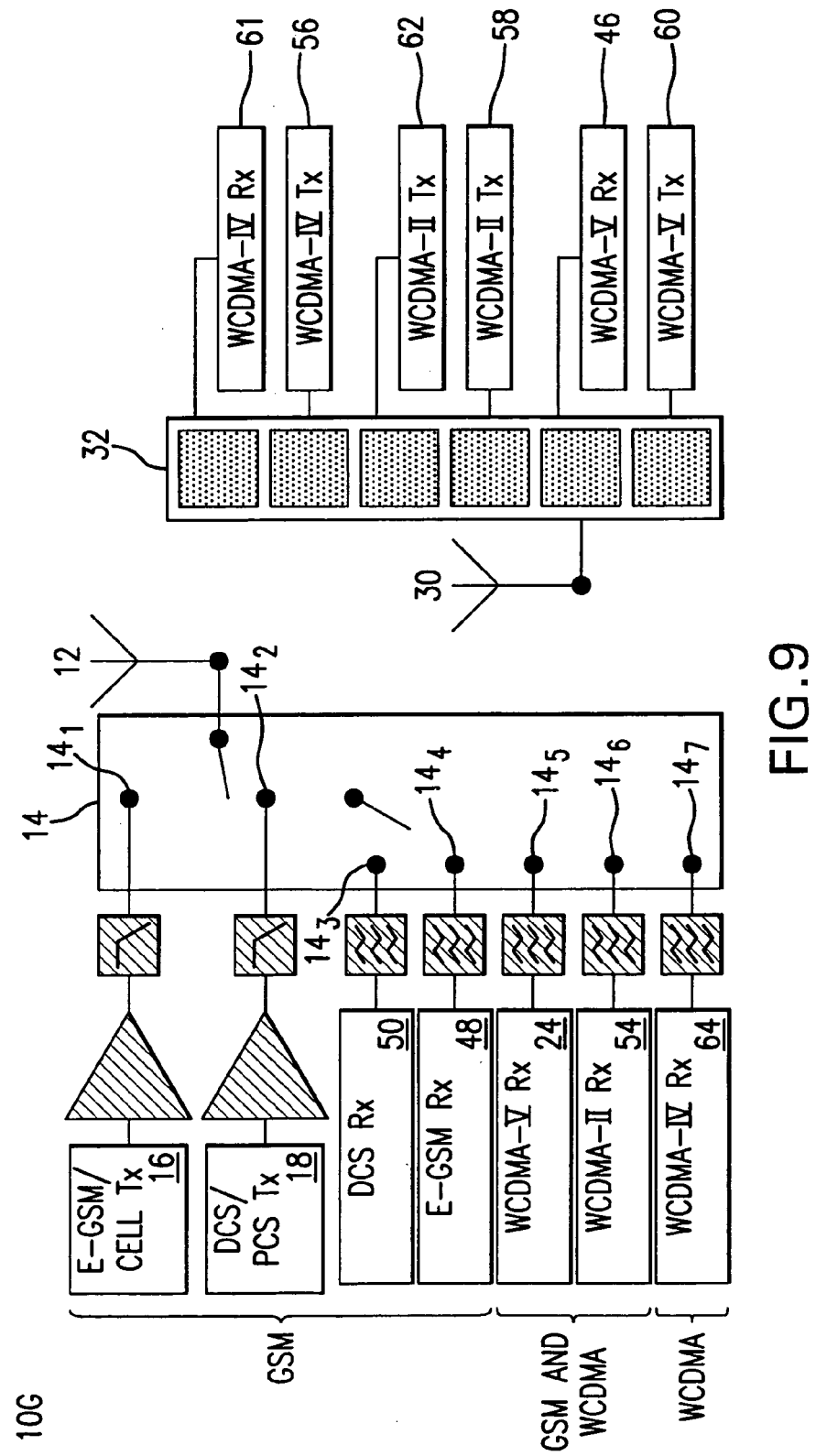
FIG. 9 illustrates a multi-band handset of the present invention.
Figure 10:
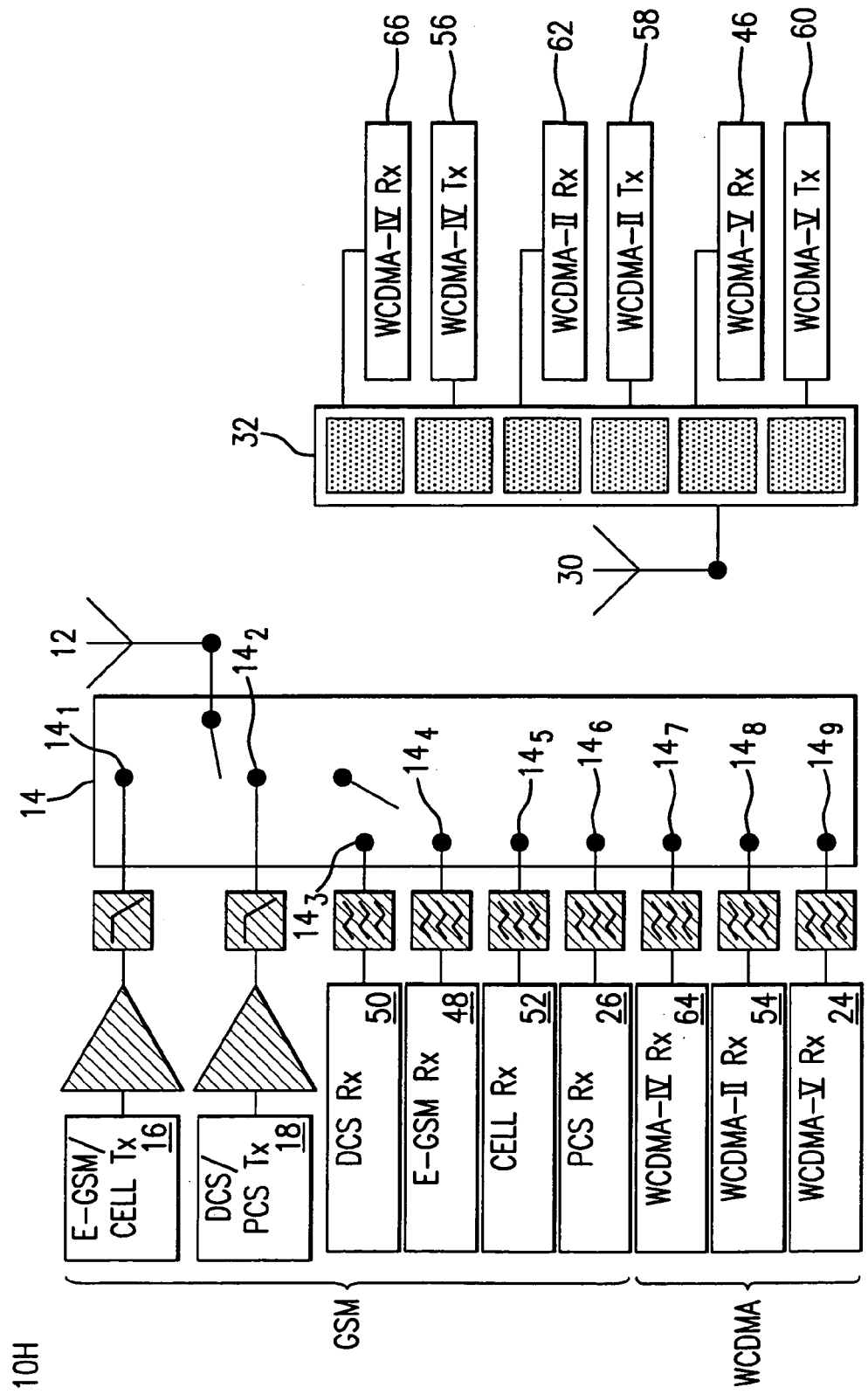
FIG. 10 illustrates a multi-band handset of the present invention.
Figure 11:
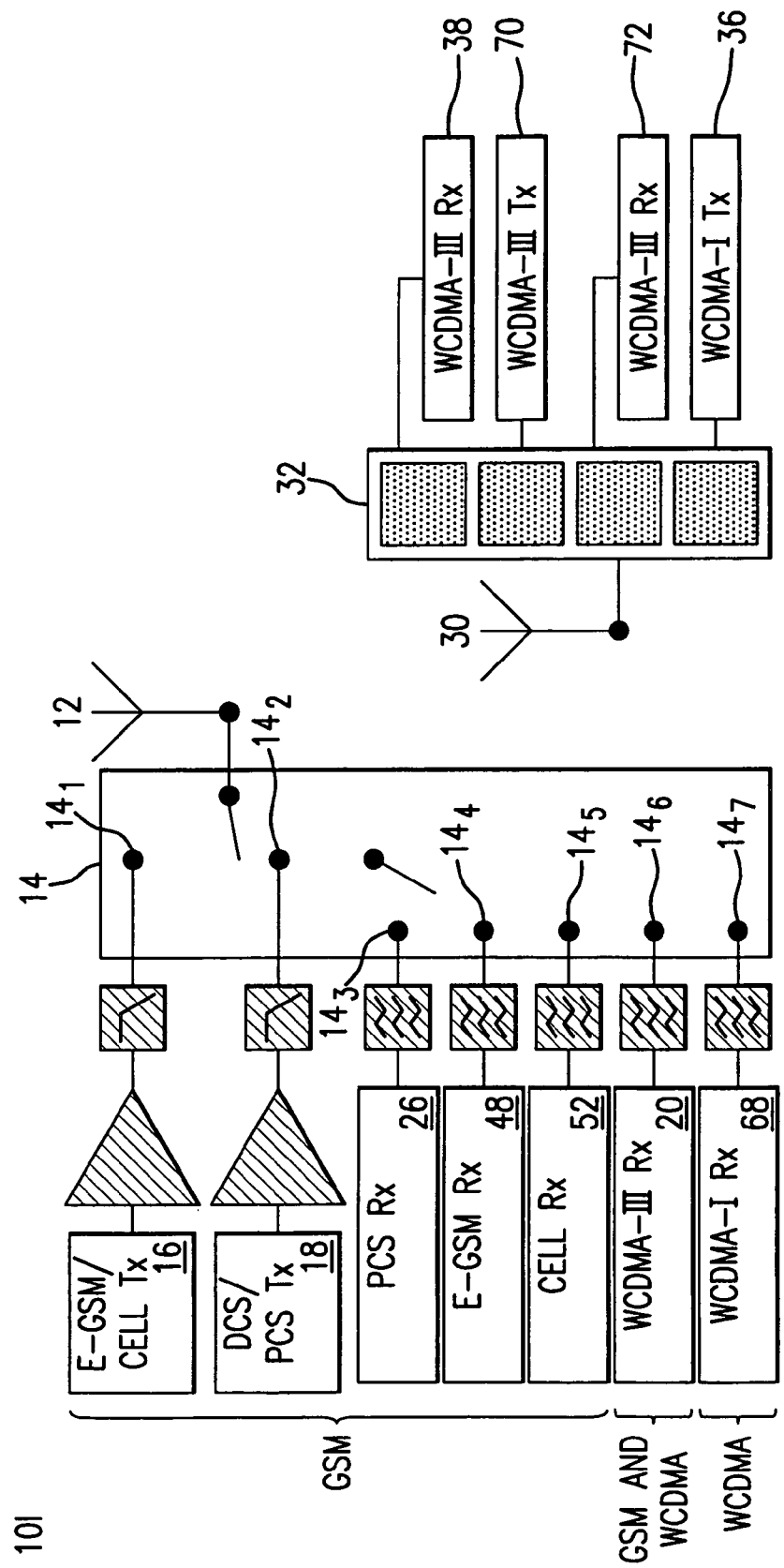
FIG. 11 illustrates a multi-band handset of the present invention.
Figure 12:
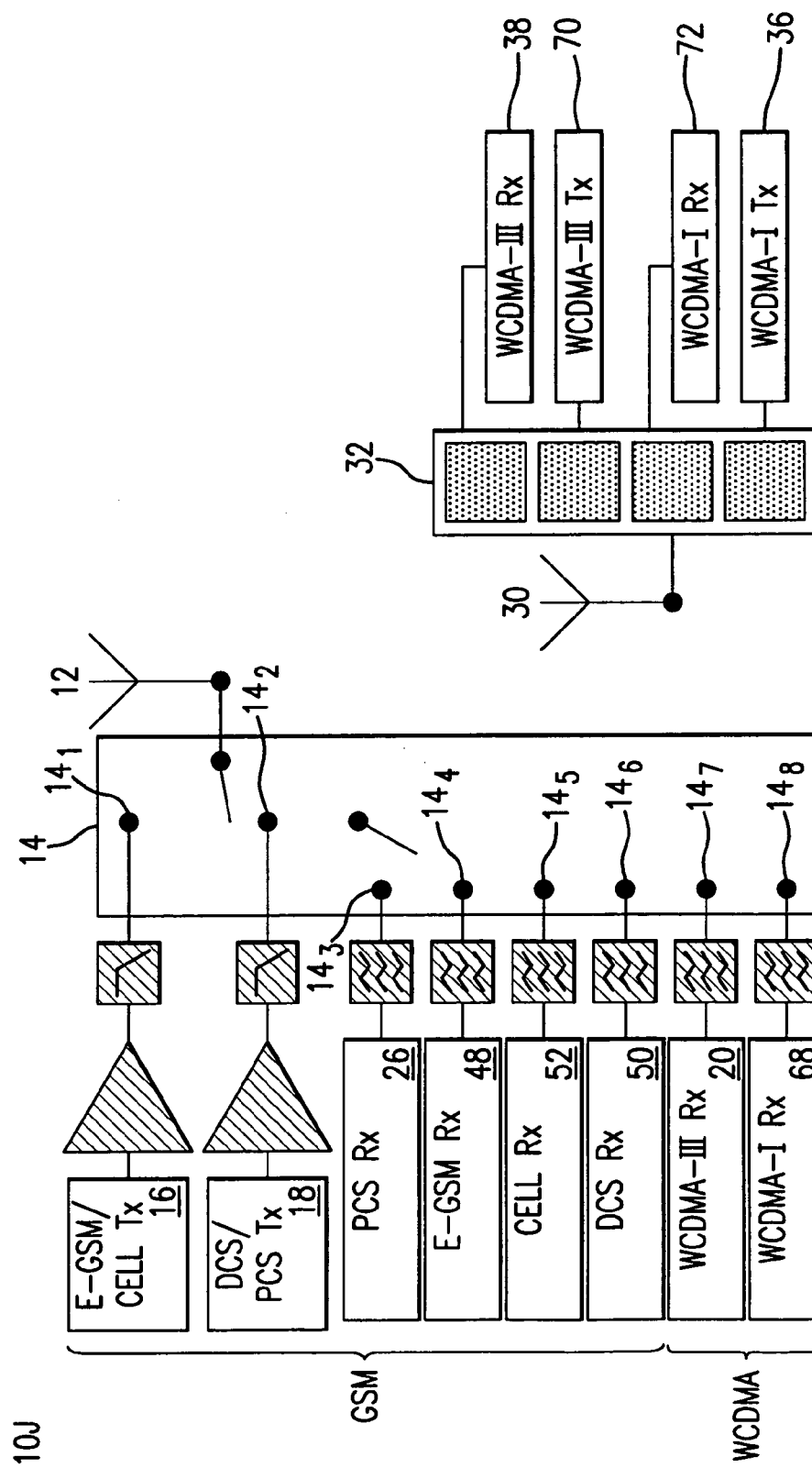
FIG. 12 illustrates a multi-band handset of the present invention.
Figure 13:
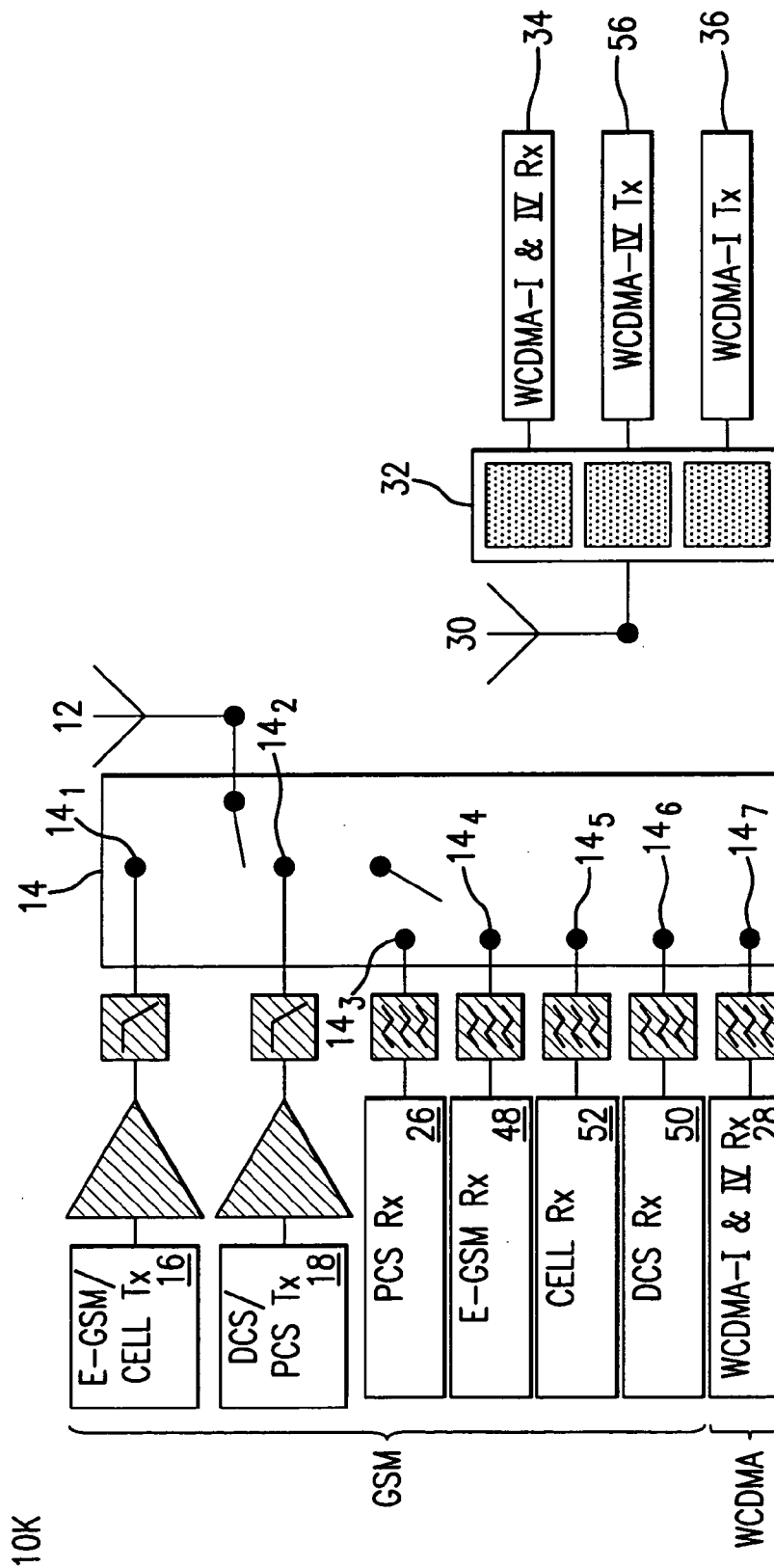
FIG. 13 illustrates a multi-band handset of the present invention.

FIGS. 3 through 13 illustrate techniques that allow these different communication standards to coexist, without introducing the switch complications, using only two antennae. FIGS. 3 and 4 illustrate an architecture that can be used globally, but is best suited for Europe and Asia. FIGS. 5 through 10 similarly illustrate architectures that are best suited for North America, although they can also be used globally. FIGS. 11 and 12 illustrate architectures that European centric. FIG. 13 illustrates an architecture that is truly world wide, but supporting only WCDMA I and WCDMA IV, along with the four GSM standards.

In several embodiments, diversity is provided by receivers that support the GSM and WCDMA standards, as shown in FIGS. 3, 5, 7, 9, and 11. FIGS. 3, 4, 5, 6, and 13 illustrate embodiments where WCDMA-I and WCDMA-WV share the Rx band and thus one path of the RF portion of the handset.

FIG. 3 illustrates an embodiment 10A of the present invention. A first antenna 12 connects to an antenna switch 14. The antenna switch 14 functions equivalently to a single pole, seven throw switch. The first throw $14_1$ connects to an E-GSM/Cell transmitter 16. The second throw $14_2$ connects to a DCS/PCS transmitter 18. The third throw $14_3$ connects to a WCDMA-III receiver 20. The WCDMA-III receiver 20 also receives the DCS frequency band. The fourth throw $14_4$ connects to a WCDMA-900 receiver 22. The WCDMA-900 receiver 22 also receives the E-GSM frequency band. The fifth throw $14_5$ connects to a WCDMA-V receiver 24. The WCDMA-V receiver 24 also receives the Cell band. The sixth throw $14_6$ connects to a PCS receiver 26. The seventh throw $14_7$ connects to a WCDMA-I & IV receiver 28.

A second antenna 30 connects to a frequency division filter 32. The frequency division filter 32 connects to: a WCDMA I & IV receiver 34, a WCDMA-I transmitter 36, a WCDMA-III receiver 38, a WCDMA III & IV transmitter 40, a WCDMA 900 receiver 42, a WCDMA 900 transmitter 44, and a WCDMA-V transmitter 46.

FIG. 4 illustrates an embodiment 10B of present invention. A first antenna 12 connects to an antenna switch 14. The antenna switch 14 functions equivalently to a single pole, ten throw switch. The first throw $14_1$ connects to an E-GSM/Cell transmitter 16. The second throw $14_2$ connects to a DCS/PCS transmitter 18. The third throw $14_3$ connects to a DCS receiver 50. The fourth throw $14_4$ connects to an E-GSM receiver 48. The fifth throw $14_5$ connects to a Cell receiver 52. The sixth throw $14_6$ connects to a PCS receiver 26. The seventh throw $14_7$ connects to a WCDMA-I & IV receiver 28. The eighth throw $14_8$ connects to a WCDMA-III receiver 20. The ninth throw $14_9$ connects to a WCDMA-900 receiver 22. The tenth throw $14_{10}$ connects to a WCDMA-V receiver 24.

A second antenna 30 connects to a frequency division filter 32. The frequency division filter 32 connects to: a WCDMA-I & IV receiver 34, a WCDMA-I transmitter 36, a WCDMA-III receiver 38, a WCDMA-III transmitter 40, a WCDMA-900 receiver 42, a WCDMA-900 transmitter 44, and a WCDMA-V transmitter 46.

Figure 5:
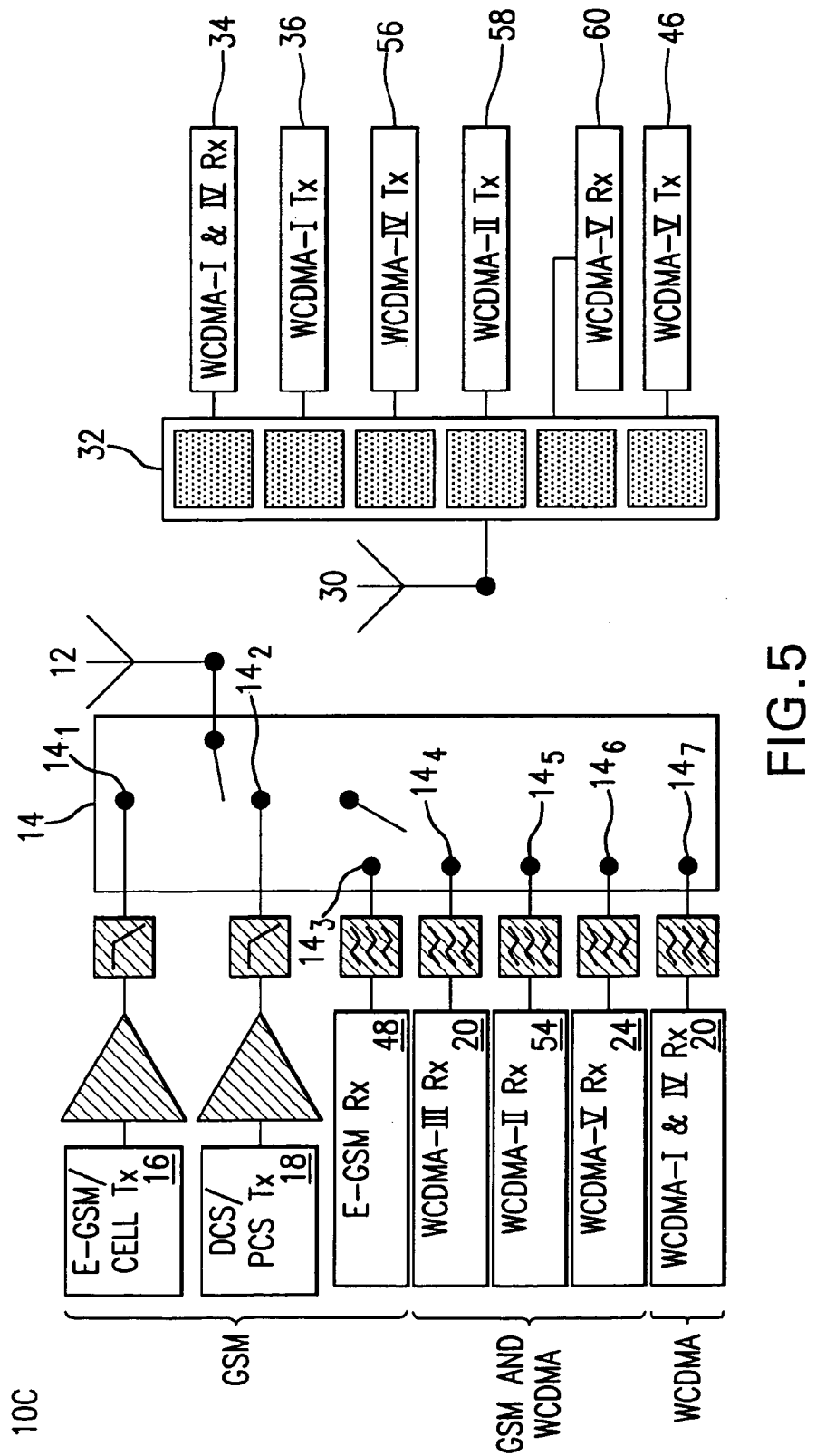
FIG. 5 illustrates a multi-band handset of the present invention.

FIG. 5 illustrates an embodiment of the present invention. A first antenna 12 connects to an antenna switch 14. The antenna switch 14 functions equivalently to a single pole, seven throw switch. The first throw $14_1$ connects to an E-GSM/Cell transmitter 16. The second throw $14_2$ connects to a DCS/PCS transmitter 18. The third throw $14_3$ connects to an E-GSM receiver 48. The fourth throw $14_4$ connects to a WCDMA-III receiver 20. The WCDMA-III receiver 20 further receives the DCS frequency band. The fifth throw $14_5$ connects to a WCDMA-II receiver 54. The WCDMA-II receiver 54 further receives the PCS frequency band. The sixth throw $14_6$ connects to a WCDMA-V receiver 24. The WCDMA-V receiver 24 further receives the Cell band. The seventh throw $14_7$ connects to a WCDMA-I & IV receiver 28.

A second antenna 30 connects to a frequency division filter 32. The frequency division filter 32 connects to: a WCDMA-I & IV receiver 34, a WCDMA-I transmitter 36, a WCDMA-IV transmitter 56, a WCDMA-II transmitter 58, a WCDMA-V receiver 60, and a WCDMA-V transmitter 46.

Figure 6:
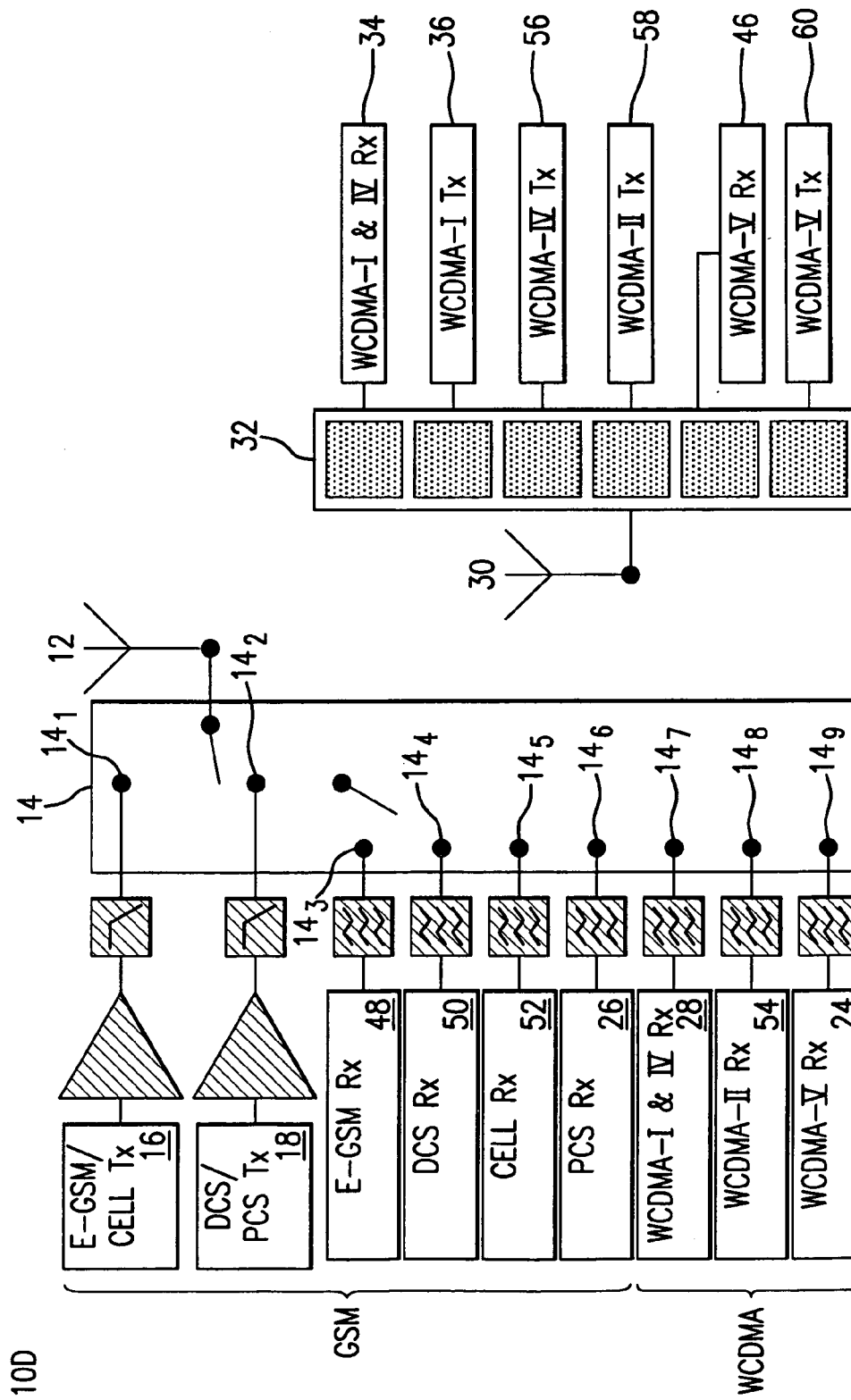
FIG. 6 illustrates a multi-band handset of the present invention.

FIG. 6 illustrates an embodiment 10D of the present invention. A first antenna 12 connects to an antenna switch 14. The antenna switch 14 functions equivalently to a single pole, nine throw switch. The first throw $14_1$ connects to an E-GSM/Cell transmitter 16. The second throw $14_2$ connects to a DCS/PCS transmitter 18. The third throw $14_3$ connects to an E-GSM receiver 48. The fourth throw $14_4$ connects to a DCS receiver 50. The fifth throw $14_5$ connects to a Cell receiver 52. The sixth throw $14_6$ connects to a PCS receiver 26. The seventh throw $14_7$ connects to a WCDMA-I & IV receiver 28. The eighth throw $14_8$ connects to a WCDMA-II receiver 54. The ninth throw $14_9$ connects to a WCDMA-V receiver 24.

A second antenna 30 connects to a frequency division filter 32. The frequency division filter 32 connects to: a WCDMA-I & IV receiver 34, a WCDMA-I transmitter 36, a WCDMA-IV transmitter 56, a WCDMA-II transmitter 58, a WCDMA-V receiver 46, and a WCDMA-V transmitter 60.

Figure 7:
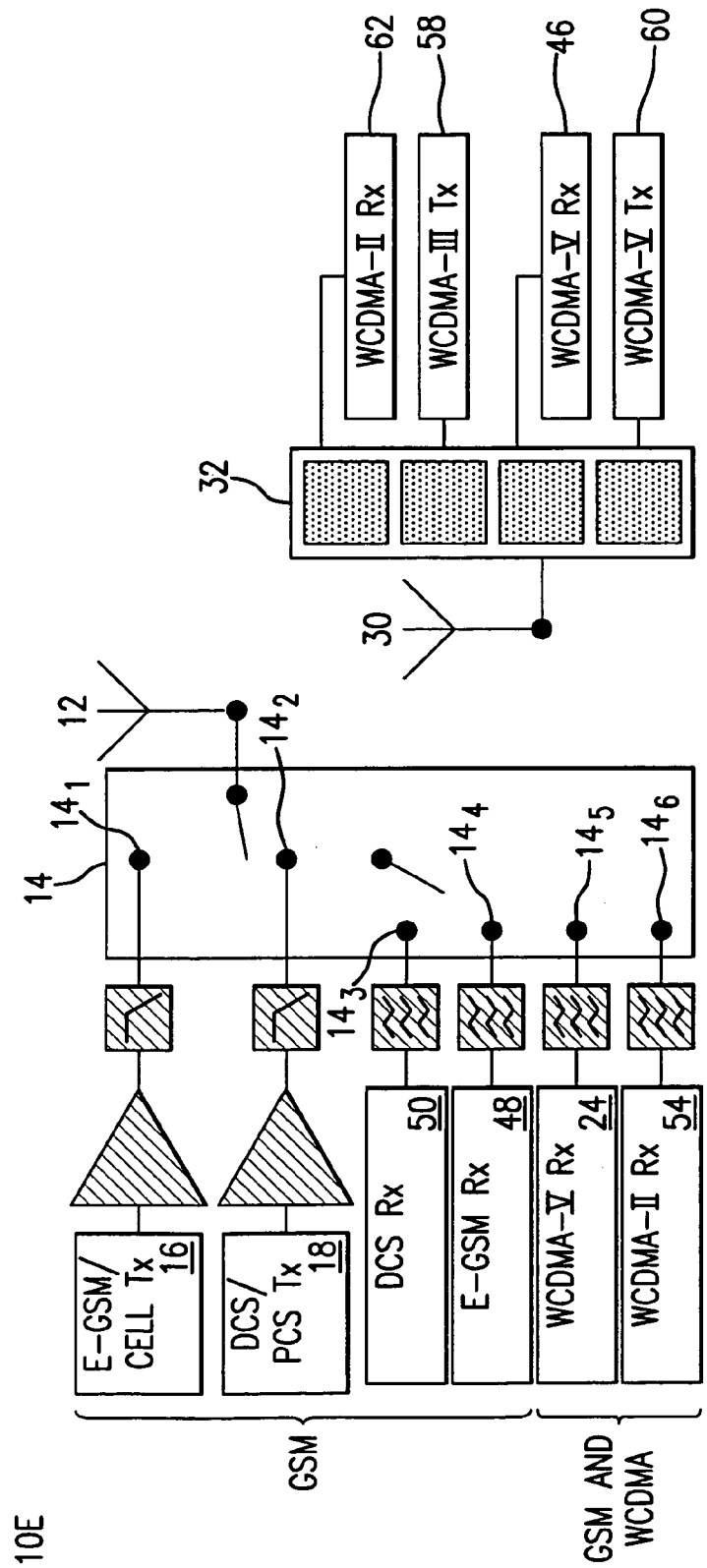
FIG. 7 illustrates a multi-band handset of the present invention.

FIG. 7 illustrates an embodiment 10E of the present invention. A first antenna 12 connects to an antenna switch 14. The antenna switch 14 functions equivalently to a single pole, six throw switch. The first throw $14_1$ connects to an E-GSM/Cell transmitter 16. The second throw $14_2$ connects to a DCS/PCS transmitter 18. The third throw $14_3$ connects to a DCS receiver 50. The fourth throw $14_4$ connects to an E-GSM receiver 48. The fifth throw $14_5$ connects to a WCDMA-V receiver 24. The WCDMA-V receiver further receives the Cell band. The sixth throw $14_6$ connects to a WCDMA-II receiver 54. The WCDMA-II receiver 54 further receives the PCS band.

A second antenna 30 connects to a frequency division filter 32. The frequency division filter 32 connects to: a WCDMA-II receiver 62, a WCDMA-II transmitter 58, a WCDMA-V receiver 46, and a WCDMA-V transmitter 60.

Figure 8:
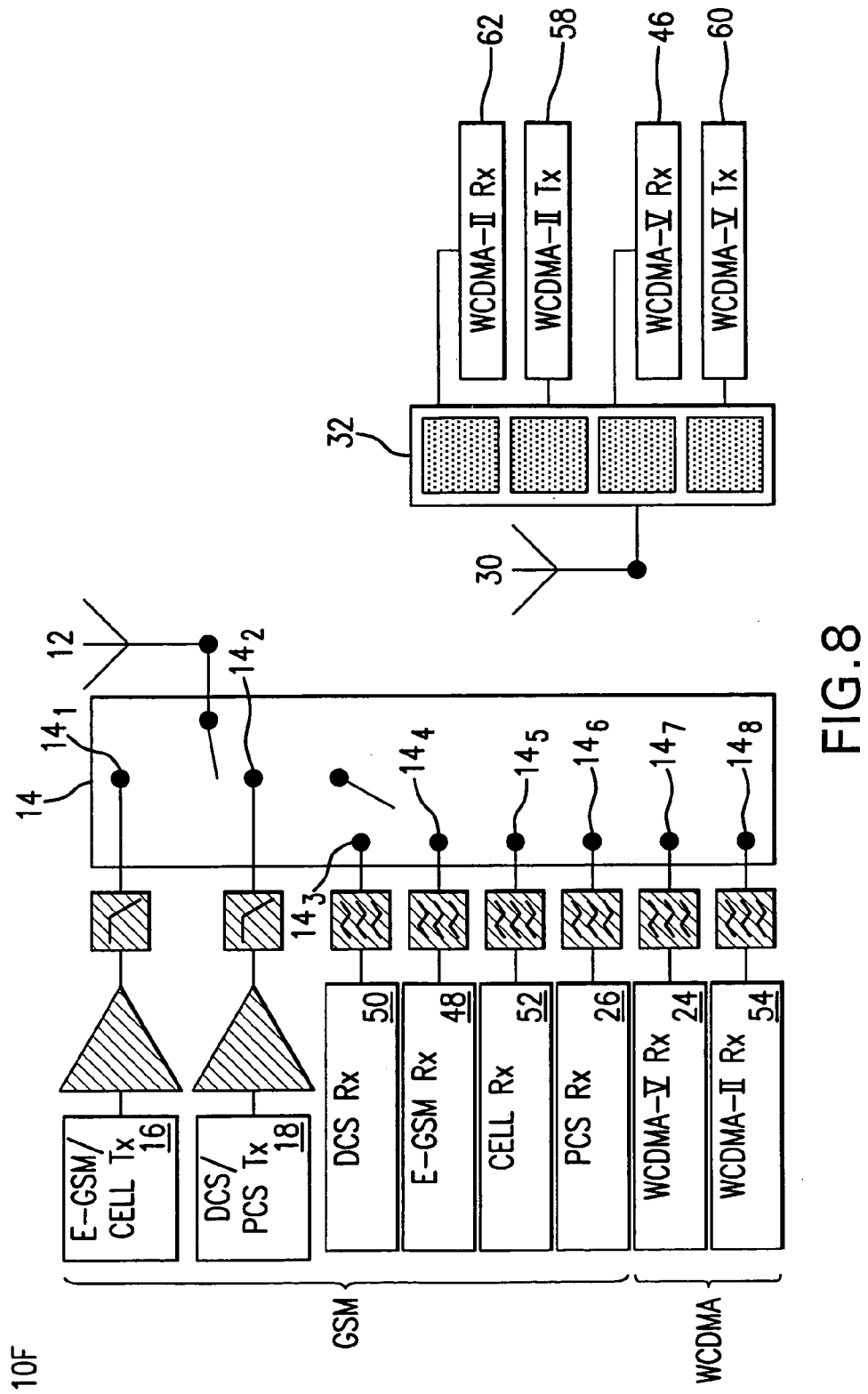
FIG. 8 illustrates a multi-band handset of the present invention.

FIG. 8 illustrates an embodiment 10F of the present invention. A first antenna 12 connects to an antenna switch 14. The antenna switch 14 functions equivalently to a single pole, eight throw switch. The first throw $14_1$ connects to an E-GSM/Cell transmitter 16. The second throw $14_2$ connects to a DCS/PCS transmitter 18. The third throw $14_3$ connects to a DCS receiver 50. The fourth throw $14_4$ connects to an E-GSM receiver 48. The fifth throw $14_5$ connects to a Cell receiver 52. The sixth throw $14_6$ connects to a PCS receiver 26. The seventh throw $14_7$ connects to WCDMA-V receiver 24. The eighth throw $14_8$ connects to a WCDMA-II receiver 54.

A second antenna 30 connects to a frequency division filter 32. The frequency division filter 32 connects to: a WCDMA-II receiver 62, a WCDMA-II transmitter 58, a WCDMA-V receiver 46, and a WCDMA-V transmitter 60.

FIG. 9 illustrates an embodiment 10G of the present invention. A first antenna 12 connects to an antenna switch 14. The antenna switch 14 functions equivalently to a single pole, seven throw switch. The first throw $14_1$ connects to an E-GSM/Cell transmitter 16. The second throw $14_2$ connects to a DCS/PCS transmitter 18. The third throw $14_3$ connects to a DCS receiver 50. The fourth throw $14_4$ connects to a E-GSM receiver 48. The fifth throw $14_5$ connects to a WCDMA-V receiver 24. The WCDMA-V receiver 24 further receives the Cell band. The sixth throw $14_6$ connects to a WCDMA-II receiver 54. The WCDMA-II receiver 54 further receives the PCS band. The seventh throw $14_7$ connects to a WCDMA-IV receiver 64.

A second antenna 30 connects to a frequency division filter 32. The frequency division filter 32 connects to: a WCDMA-IV receiver 66, a WCDMA-IV transmitter 56, a WCDMA-II receiver 62, a WCDMA-II transmitter 58, a WCDMA-V receiver 46, and a WCDMA-V transmitter 60.

FIG. 10 illustrates an embodiment 10H of the present invention. A first antenna 12 connects to an antenna switch 14. The antenna switch 14 functions equivalently to a single pole, nine throw switch. The first throw $14_1$ connects to an E-GSM/Cell transmitter 16. The second throw $14_2$ connects to a DCS/PCS transmitter 18. The third throw $14_3$ connects to a DCS receiver 50. The fourth throw $14_4$ connects to an E-GSM receiver 48. The fifth throw $14_5$ connects to a Cell receiver 52. The sixth throw $14_6$ connects to a PCS receiver 26. The seventh throw $14_7$ connects to a WCDMA-WV receiver 64. The eighth throw $14_8$ connects to a WCDMA-II receiver 54. The ninth throw $14_9$ connects to a WCDMA-V receiver 24.

A second antenna 30 connects to a frequency division filter 32. The frequency division filter 32 connects to: a WCDMA-IV receiver 66, a WCDMA-IV transmitter 56, a WCDMA-II receiver 62, a WCDMA-I transmitter 58, a WCDMA-V receiver 46, and a WCDMA-V transmitter 60.

FIG. 11 illustrates an embodiment 10I of the present invention. A first antenna 12 connects to an antenna switch 14. The antenna switch 14 functions equivalently to a single pole, seven throw switch. The first throw $14_1$ connects to an E-GSM/Cell transmitter 16. The second throw $14_2$ connects to a DCS/PCS transmitter 18. The third throw $14_3$ connects to a PCS receiver 26. The fourth throw $14_4$ connects to a E-GSM receiver 48. The fifth throw $14_5$ connects to a Cell receiver 52. The sixth throw $14_6$ connects to a WCDMA-III receiver 20. The WCDMA-III receiver 20 further receives the DCS band. The seventh throw $14_7$ connects to a WCDMA-I receiver 68.

A second antenna 30 connects to a frequency division filter 32. The frequency division filter 32 connects to: a WCDMA-I receiver 38, a WCDMA-I transmitter 70, a WCDMA-III receiver 72, and a WCDMA-Ill transmitter 36.

FIG. 12 illustrates an embodiment 10 J of the present invention except the antenna switch 14 functions equivalently to a single pole, eight throw switch. The first throw $14_1$ connects to an E-GSM/Cell transmitter 16. The second throw $14_2$ connects to a DCS/PCS transmitter 18. The third throw $14_3$ connects to a PCS receiver 26. The fourth throw $14_4$ connects to an E-GSM receiver 48. The fifth throw $14_5$ connects to a Cell receiver 52. The sixth throw $14_6$ connects to a DCS receiver 50. The seventh throw $14_7$ connects to a WCDMA-III receiver 20. The eighth throw $14_8$ connects to a WCDMA-I receiver 68.

A second antenna 30 connects to a frequency division filter 32. The frequency division filter 32 connects to: a WCDMA-I receiver 38, a WCDMA-I transmitter 70, a WCDMA-III receiver 72, and a WCDMA-III transmitter 36.

FIG. 13 illustrates an embodiment 10K of the present invention. A first antenna 12 connects to an antenna switch 14. The antenna switch 14 functions equivalently to a single pole, seven throw switch. The first throw $14_1$ connects to an E-GSM/Cell transmitter 16. The second throw $14_2$ connects to a DCS/PCS transmitter 18. The third throw $14_3$ connects to a PCS receiver 26. The fourth throw $14_4$ connects to an E-GSM receiver 48. The fifth throw $14_5$ connects to a Cell receiver 52. The sixth throw $14_6$ connects to a DCS receiver 50. The seventh throw $14_7$ connects to a WCDMA-I and IV receiver 28.

A second antenna 30 connects to a frequency division filter 32. The frequency division filter 32 connects to: a WCDMA-I and IV receiver 34, a WCDMA-I transmitter 56, and a WCDMA-IV transmitter 36.

In each embodiment disclosed, the second antenna is connected to a frequency division filter. One frequency division filter is disclosed by Bradley, et al., in U.S. application Ser. No. 10/899,556, "Modular Frequency Division Filter", assigned to Agilent Technologies, filed 26 Jul. 2004. In the disclosed modular frequency division filter, each transmission path includes either a band pass filter or a duplexer to separate the received signal by frequency. Frequency phase shifters or shunt inductors may be included to further enhance the frequency separation. Following frequency separation, the separated signal is transceived by a device operating at the respective separated frequency.

The invention claimed is:

1. A handset comprising:
   a fist antenna;
   an antenna switch, connecting to the first antenna, receivers and transmitters for a plurality of multiple time division band standards, and a receiver for each of M frequency division band standards, where M≧1;
   a second antenna transceiving a multi-band frequency division multiplexed signal; and
   a frequency division filter, having an input connected to the second antenna, transmitting or transceiving the M frequency division band standards.

2. A handset, as defined in claim 1, wherein:
   the plurality of multiple time division band standards is selected from a group that includes E-GSM, Cell, DCS, and PCS;
   the M frequency division band standards are selected from a group that includes WCDMA-900, WCDMA-I, WCDMA-II, WCDMA-III, WCDMA-IV, and WCDMA V.

3. A handset, as defined in claim 2, wherein M=2, the M frequency division band standards being WCDMA-I and WCDMA-IV.

4. A handset, as defined in claim 3, wherein the receiver for each of M frequency division band standards receives WCDMA-I and WCDMA-IV.

5. A handset, as defined in claim 2, wherein M=2, the M frequency division band standards being WCDMA-I and WCDMA-III.

6. A handset, as defined in claim 5, wherein the receiver for WCDMA-III frequency division band standard is the receiver for the DCS time division band standard.

7. A handset, as defined in claim 2, wherein M=3, the M frequency division band standards being WCDMA-II, WCDMA-IV and WCDMA-V.

8. A handset, as defined in claim 7, wherein:
the receiver for WCDMA-II frequency division band standard is the receiver for the PCS time division band standard; and
the receiver for WCDMA-V frequency division band standard is the receiver for the Cell time division band standard.

9. A handset, as defined in claim 2, wherein M=2, the M frequency division band standards being WCDMA-II and WCDMA-V.

10. A handset, as defined in claim 9, wherein:
the receiver for WCDMA-II frequency division band standard is the receiver for the PCS time division band standard; and
the receiver for WCDMA-V frequency division band standard is the receiver for the Cell time division band standard.

11. A handset, as defined in claim 2, wherein M=4, the M frequency division band standards being WCDMA-I, WCDMA-II, WCDMA-IV and WCDMA-V.

12. A handset, as defined in claim 11, wherein:
the receiver for WCDMA-II frequency division band standard is the receiver for the PCS time division band standard;
the receiver for WCDMA-III frequency division band standard is the receiver for the DCS time division band standard; and
the receiver for WCDMA-V frequency division band standard is the receiver for the Cell time division band standard.

13. A handset, as defined in claim 2, wherein M=5, the M frequency division band standards being WCDMA-900, WCDMA-I, WCDMA-III, WCDMA-IV and WCDMA-V.

14. A handset, as defined in claim 13, wherein:
the receiver for WCDMA-III frequency division band standard is the receiver for the DCS time division band standard;
the receiver for WCDMA-V frequency division band standard is the receiver for the Cell time division band standard; and
the receiver for WCDMA-900 frequency division band standard is the receiver for the E-GSM time division band standard.

* * * * *